United States Patent
Davydov et al.

(10) Patent No.: US 9,197,371 B2
(45) Date of Patent: Nov. 24, 2015

(54) COORDINATED MULTIPOINT COMMUNICATION NETWORK WITH MULTIPLE COOPERATING ENBS AND METHOD FOR BEAMFORMING COORDINATION WITH INTERFERENCE SUPPRESSION

(75) Inventors: Alexei Vladimirovich Davydov, Nizhny Novgorod (RU); Alexander Alexandrovich Maltsev, Nizhny Novgorod (RU); Gregory Vladimirovich Morozov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 44 days.

(21) Appl. No.: 13/883,390

(22) PCT Filed: Sep. 14, 2011

(86) PCT No.: PCT/RU2011/000703
§ 371 (c)(1),
(2), (4) Date: Jun. 3, 2013

(87) PCT Pub. No.: WO2012/060733
PCT Pub. Date: May 10, 2012

(65) Prior Publication Data
US 2013/0250885 A1   Sep. 26, 2013

Related U.S. Application Data

(60) Provisional application No. 61/410,740, filed on Nov. 5, 2010.

(51) Int. Cl.
 *H04W 4/00*   (2009.01)
 *H04L 1/00*   (2006.01)
 (Continued)

(52) U.S. Cl.
 CPC ............... *H04L 1/009* (2013.01); *H04B 7/024* (2013.01); *H04B 7/0413* (2013.01);
 (Continued)

(58) Field of Classification Search
 CPC .... H04B 7/024; H04B 7/0404; H04B 7/0413; H04B 7/0456; H04B 7/0486; H04B 7/086; H04B 7/0417; H04B 7/0632; H04L 5/0035; H04L 1/0026; H04L 5/0048; H04L 5/0073; H04W 24/10; H04W 52/243
 USPC .......... 370/329, 328, 241, 252, 238; 455/129, 455/67.11, 501, 63.1; 375/266, 267, 295
 See application file for complete search history.

(56) References Cited

U.S. PATENT DOCUMENTS 8,036,131 B2 * 10/2011 Roh et al. ............... 370/241
8,831,654 B2 *  9/2014 Kim et al. ............... 455/501
(Continued)

FOREIGN PATENT DOCUMENTS

CN     101674275 A     3/2010
WO  WO-2009084903 A2  7/2009
(Continued)

OTHER PUBLICATIONS

"Chinese Application Serial No. 201180002696.6, Office Action mailed May 6, 2014", w/English translation, 17 pgs.
(Continued)

*Primary Examiner* — David Oveissi
(74) *Attorney, Agent, or Firm* — Schwegman Lundberg & Woessner, P.A.

(57) ABSTRACT

Embodiments of an enhanced Node-B (eNB) configured to operate as a serving eNB in a coordinated multi-point (CoMP) communication network and method are generally described herein. The serving eNB precodes signals for transmission to user equipment (UE) using a precoding matrix that is selected based on a reference PMI for a beamformed transmission in accordance with a modulation and coding scheme (MCS) that is selected from a modified CQI. When operating in coordination mode, on more cooperating eNBs are configured to suppress interference to the UE using coordination PMIs during the resource block allocated for the beamformed transmission.

20 Claims, 3 Drawing Sheets

(51) Int. Cl.
*H04B 7/02* (2006.01)
*H04B 7/06* (2006.01)
*H04W 52/02* (2009.01)
*H04W 72/04* (2009.01)
*H04W 40/24* (2009.01)
*H04L 5/00* (2006.01)
*H04B 7/04* (2006.01)
*H04L 1/20* (2006.01)
*H04W 52/36* (2009.01)
*H04W 52/14* (2009.01)
*H04W 52/34* (2009.01)

(52) U.S. Cl.
CPC .......... *H04B 7/0452* (2013.01); *H04B 7/0456* (2013.01); *H04B 7/0482* (2013.01); *H04B 7/0617* (2013.01); *H04B 7/0639* (2013.01); *H04B 7/0652* (2013.01); *H04L 1/20* (2013.01); *H04L 5/0048* (2013.01); *H04W 40/24* (2013.01); *H04W 52/0209* (2013.01); *H04W 52/365* (2013.01); *H04W 72/042* (2013.01); *H04W 72/0473* (2013.01); *H04L 2001/0093* (2013.01); *H04L 2001/0097* (2013.01); *H04W 52/146* (2013.01); *H04W 52/34* (2013.01)

(56) References Cited

U.S. PATENT DOCUMENTS

2010/0220675 A1* 9/2010 Chun et al. .................... 370/329
2011/0319027 A1* 12/2011 Sayana et al. .............. 455/67.11

FOREIGN PATENT DOCUMENTS

WO  WO-2010124725 A1  11/2010
WO  WO-2012060733 A1  5/2012

OTHER PUBLICATIONS

"European Application Serial No. 11793882.9, Amendment filed Jan. 27, 2014", 17 pgs.
"International Application Serial No. PCT/RU2011/000703, International Preliminary Report on Patentability mailed May 16, 2013", 8 pgs.
"International Application Serial No. PCT/RU2011/000703, Search Report mailed Mar. 14, 2012", 3 pgs.
"International Application Serial No. PCT/RU2011/000703, Written Opinion mailed Mar. 14, 2012", 7 pgs.
"Chinese Application Serial No. 201180002696.6, Office Action mailed Dec. 19, 2014", W/English Translation, 9 pgs.
"Chinese Application Serial No. 201180002696.6, Response filed Sep. 22, 2014 to Office Action mailed May 6, 2014", W/English Claims, 19 pgs.

* cited by examiner

COORDINATED MULTIPOINT COMMUNICATION NETWORK WITH MULTIPLE COOPERATING ENBS AND METHOD FOR BEAMFORMING COORDINATION WITH INTERFERENCE SUPPRESSION

PRIORITY CLAIM

This application is a U.S. National Stage Filing under 35 U.S.C. 371 from International Patent Application Serial No. PCT/RU2011/000703, filed Sep. 14, 2011, and published on May 10, 2012 as WO 2012/060733A1, which claims the benefit of priority under 35 USC 119(e) to U.S. Provisional Patent Application Ser. No. 61/410,740, filed Nov. 5, 2010, both of which are incorporated herein by reference in their entirety.

TECHNICAL FIELD

Embodiments pertain to wireless communications. Some embodiments relate to coordinated multipoint communications. Some embodiments relate to 3GPP LTE Advanced networks. Some embodiments relate to WiMAX networks and networks configured in accordance with one of the IEEE 802.16 standards.

BACKGROUND

Coordinated multipoint (CoMP) communication networks coordinate and/or combine signals from multiple antennas or base stations to make it possible for mobile users to enjoy consistent performance and quality when they access and share videos, photos and other high-bandwidth services, whether they are close to the center of their serving cell or at its outer edges. One issue with CoMP networks is that conventional channel quality feedback schemes do not take into account a reduction in interference that can be achieved by coordination.

Thus, there are general needs for CoMP networks and methods for beamforming coordination that take into account the reduction in interference that results from the coordination of the base stations. There are also general needs for channel quality feedback schemes suitable for interference suppression in a CoMP network.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
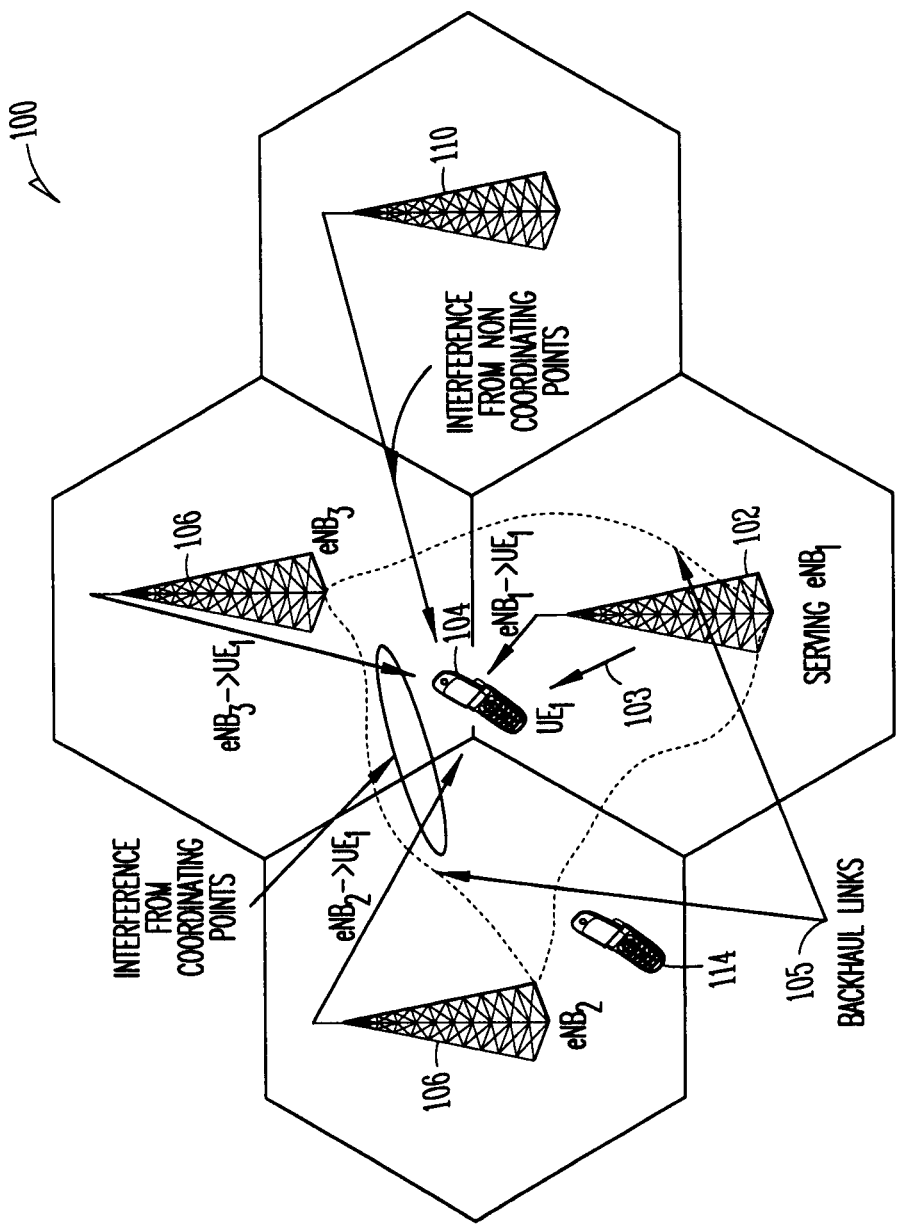
FIG. 1 illustrates a CoMP communication network in accordance with some embodiments.

FIG. 1 illustrates a CoMP communication network in accordance with some embodiments. CoMP communication network 100 includes a plurality of enhanced Node B's (eNBs) including a serving eNB 102 which provides communication services to user equipment (UE) 104, one or more cooperating eNBs 106, and one or more non-cooperating eNBs 110. In some embodiments, CoMP network 100 may be a wireless access network configured for orthogonal frequency division multiple access (OFDMA) communications. In some embodiments, network 100 may be configured to operate in accordance with one of the 3rd Generation Partnership Project (3GPP) Technical Specifications for Evolved Universal Terrestrial Radio Access (E-UTRA) (e.g., 3GPP LTE Release 10 or later, referred to as LTE advanced).

In accordance with embodiments, the one or more cooperating eNBs 106 are configured to suppress interference to the UE 104 during a beamformed transmission 103 from the serving eNB 102 to the UE 104. In these embodiments, the serving eNB 102 may receive a reference channel quality indicator (CQI) and one or more coordination CQIs from the UE 104. The eNB 102 may also receive a reference precoding matrix indicator (PMI) associated with the reference CQI and a coordination PMI associated with each coordination CQI from the UE 104. The serving eNB 102 may calculate a modified CQI from the reference CQI and the coordination CQIs, and precode signals for transmission to the UE 104 using a precoding matrix that is selected based on the reference PMI for the beamformed transmission 103. A modulation and coding scheme (MCS) for the beamformed transmission 103 may be selected from the modified CQI. When operating in coordination mode, one or more cooperating eNBs 106 are configured to suppress interference to the UE 104 using the coordination PMIs during the scheduled beamformed transmission 103 from the serving eNB 102 to the UE 104. These embodiments are described in more detail below. The beamformed transmission may be configured in accordance with a multiple-input multiple-output (MIMO) communication technique, or a single-input single-output (SISO) communication technique.

In these embodiments, the coordination of beamforming across multiple eNBs allows interference from the cooperating eNBs 106 to be suppressed. This suppression of interference from other cells allows the serving eNB 102 to use a MCS associated with a greater throughput for the beamformed transmission 103 to the UE 104.

In some embodiments when two or more cooperating eNBs 106 are configured to suppress interference, the serving eNB 102 may receive two or more coordination CQIs from the UE 104 along with an associated two or more PMIs. When only one cooperating eNB 106 is configured to suppress interference, the serving eNB 102 may receive one coordination CQI from the UE 104 along with an associated PMI.

In accordance with embodiments, the reference CQI may be selected by the UE 104 based on direct channel information from the serving eNB 102 and each coordination CQI may be selected by the UE 104 based on both the direct channel information and interfering channel information for each of the cooperating eNBs 106. The MCS that is selected based on the modified CQI is configured to provide a greater data rate or throughput than an MCS that would be selected based solely on the reference CQI.

The serving eNB 102 does not use the precoding matrix to suppress interference, but the serving eNB 102 takes into account the fact that there will be less interferences since the cooperating eNBs 106 will be concurrently transmitting along with the serving eNB 102 to the UE 104. Thus, an MCS associated with a greater data rate than the reference CQI would indicate may be used. In these embodiments, a greater data rate or throughput is possible because the selected MCS takes into account the suppression of interference by the one or more cooperating eNBs 106. In these embodiments, the overhead associated with the transmission of CQI reports is reduced and possibly minimized because the UE 104 may feedback only the CQI corresponding to an uncoordinated scenario (e.g., based on the signal to interference and noise ratio (SINR)) and scenarios with coordination of the serving eNB 102 (i.e., $eNB_1$) with each individual cooperating eNB 106 (i.e., $eNB_j$ ($SINR_j$), j=2 ... N, where N is the total number of cooperating eNBs including the serving eNB 102). In these embodiments, the reported CQI set may include N reports which may be used by the serving eNB 102 to derive a modified CQI for almost any combination of one or more cooperating eNBs 106. In these embodiments, the modified CQI may be calculated based on an increase in SINR based on the cooperation of $eNB_{k1}$, ..., $eNB_{km}$ is provided below:

$$\frac{1}{SINR_{k_1,\ldots,k_m}} = \sum_{i \in \{k_1,\ldots,k_m\}} \frac{1}{SINR_{k_i}} - \frac{m-1}{SINR}.$$

In some embodiments, the serving eNB 102 is configured to provide the coordination PMIs to the cooperating eNBs 106 over backhaul links 105 of a backhaul network. The serving eNB 102 may also provide resource block information to the cooperating eNBs 106 over the backhaul links 105. The resource block information may indicate the particular resource block (RB) in an OFDMA frame to be used by the cooperating eNBs 106 for interference suppression to the UE 104. The resource block information may, for example, indicate the set of subcarriers and OFDM symbols to be used by the cooperating eNBs 106 for interference suppression to the UE 104. The serving eNB 102 may allocate these resources (e.g., the set of subcarriers and OFDM symbols) as part of a resource allocation for the transmission of data to the UE 104 (i.e., as part of the beamformed transmission 103). Accordingly, the serving eNB 102 may provide the RB allocation to the cooperating eNBs 106 so that the cooperating eNBs 106 will be able to suppress interference to the UE 104 within the allocated RB (i.e., where the UE is scheduled).

In some embodiments when the cooperating eNBs 106 are operating in coordination mode, the cooperating eNBs 106 are configured to use the coordination PMIs to adjust their beamformed transmissions within nearby cells to other UEs 114 to suppress interference to the UE 104 by applying beamforming vectors that are at least partially orthogonal (i.e., orthogonal or semi-orthogonal) to eigenvectors reported by the UE 104 to the serving eNB 102 in the form of the coordination PMIs. In these embodiments, the cooperating eNBs 106 may only need to adjust their transmissions during indicated RB that is allocated by the serving eNB 102.

In some embodiments, the direct channel information used by the UE 104 to determine the reference CQI is based on a direct channel matrix (H) and a SINR derived from reference signals or pilots received from the serving eNB 102 over a direct channel between the serving eNB 102 and the UE 104. The interfering channel information used by the UE 104 to determine the coordination CQI associated with each of the cooperating eNBs 106 comprises an interfering channel matrix (G) of an interference channel derived from reference signals or pilots received from the cooperating eNBs 106. In these embodiments, the reference CQI may be derived from pilots or reference signals received from the serving eNB 102.

The calculation of the reference CQI based on the direct channel matrix (H) assumes an uncoordinated scenario, while the calculation of each of the coordination CQIs based on an interfering channel matrix (G) assumes an interference-suppression model.

In these embodiments, the signal model used for CQI calculation by the UE 104 may be represented in the following form:

$$r = Hv^{(eNB_1 \to UE_1)}x + \sum_{j \in \{k_1,\ldots,k_m\}} G_j v_\perp^{(eNB_j \to UE_1)} y_j + n, \quad (1a)$$

In the above equation (1a), $k_1, \ldots, k_m$ is the set of eNBs participating in the beamforming coordination (including the one or more cooperating eNBs 106 but not including the serving eNB 102), H is a channel matrix from the serving $eNB_1$ to the UE 104 (i.e., $UE_1$), $G_j$ is interfering channel matrix from a cooperating $eNB_j$ to the $UE_1$, $v_\perp^{(eNB_j \to UE_1)}$ is a vector or set of unitary vectors orthogonal to $v^{(eNB_j \to UE_1)}$, n is additive noise plus interference from other cells which are not involved in the cooperation. It is seen from the equation (1a) that UE 104 assumes that each cooperating $eNB_j$ 106 applies beamforming vector(s) which are orthogonal to the eigenvector(s) reported by the UE 104 to serving eNB 102 in the form of coordination PMI. Depending on the receiver type that is employed, the UE 104 calculates the effective post-processing SINR form the equation (1a) and encodes the SINR value to CQI. In these embodiments, the receiver types that may be employed may include zero-forcing (ZF), maximum-ratio combining (MRC) and minimum mean square error (MMSE) type receivers.

Perfect interference suppression from the cooperating eNBs 106 can be also considered as a special case of (1a) with the signal model represented in the following form:

$$r = Hv^{(eNB_1 \to UE_1)}x + n \quad (1b)$$

In equations (1a) and (1b), the value of n may depend on the set $k_1 \ldots k_m$ of cooperating eNBs 106. The information about the set $k_1, \ldots, k_m$ of cooperating eNBs 106 (i.e., that are participating in the beamforming coordination) may not be known at the UE 104. In this case the UE 104 would need to report multiple CQIs corresponding to all possible eNB combinations that may participate in the beamforming coordination. The number of combinations for N cooperating eNBs is equal to $2^{N-1}$ and grows exponentially with N. For example, in case of two cooperating eNBs, the UE 104 would calculate four CQIs corresponding to the scenarios without coordination: (1), coordination of $eNB_1 + eNB_2$ (2), coordination $eNB_1 + eNB_3$ (3) and coordination of $eNB_1 + eNB_2 + eNB_3$ (4). This direct reporting of multiple CQIs by $UE_1$ leads to a set of $2^{N-1}$ CQIs that are fed back resulting in large overhead for N>2. Embodiments disclosed herein minimize the feedback of the CQI reports because the UE 104 may be configured to feedback only the CQIs corresponding to uncoordinated scenario (based on SINR with the serving eNB 102) and corresponding to scenarios with coordination of the serving $eNB_1$ 102 and with single $eNB_j$ ($SINR_j$), for j=2 ... N, as discussed above. As a result, a set of CQIs for feedback will be equal to N.

In some embodiments, the CQI is an indication of the downlink mobile radio channel quality as experienced by the UE 104 and corresponds to an optimum MCS for a given radio link quality so that the resulting transport block error rate would not exceed a predetermined rate (e.g., 10%). In some LTE embodiments, sixteen combinations of MCS may be specified as possible CQI values, reported as a CQI. The PMI is an indication of the optimum precoding matrix to be used by an eNB for a given channel condition. The PMI may refer to a codebook or codebook table and may allow the network to configure a number of RBs that are represented by a PMI report. The RI may indicate the number of useful transmission layers when spatial multiplexing is used. In case of transmit diversity, rank may equal one.

Figure 2:
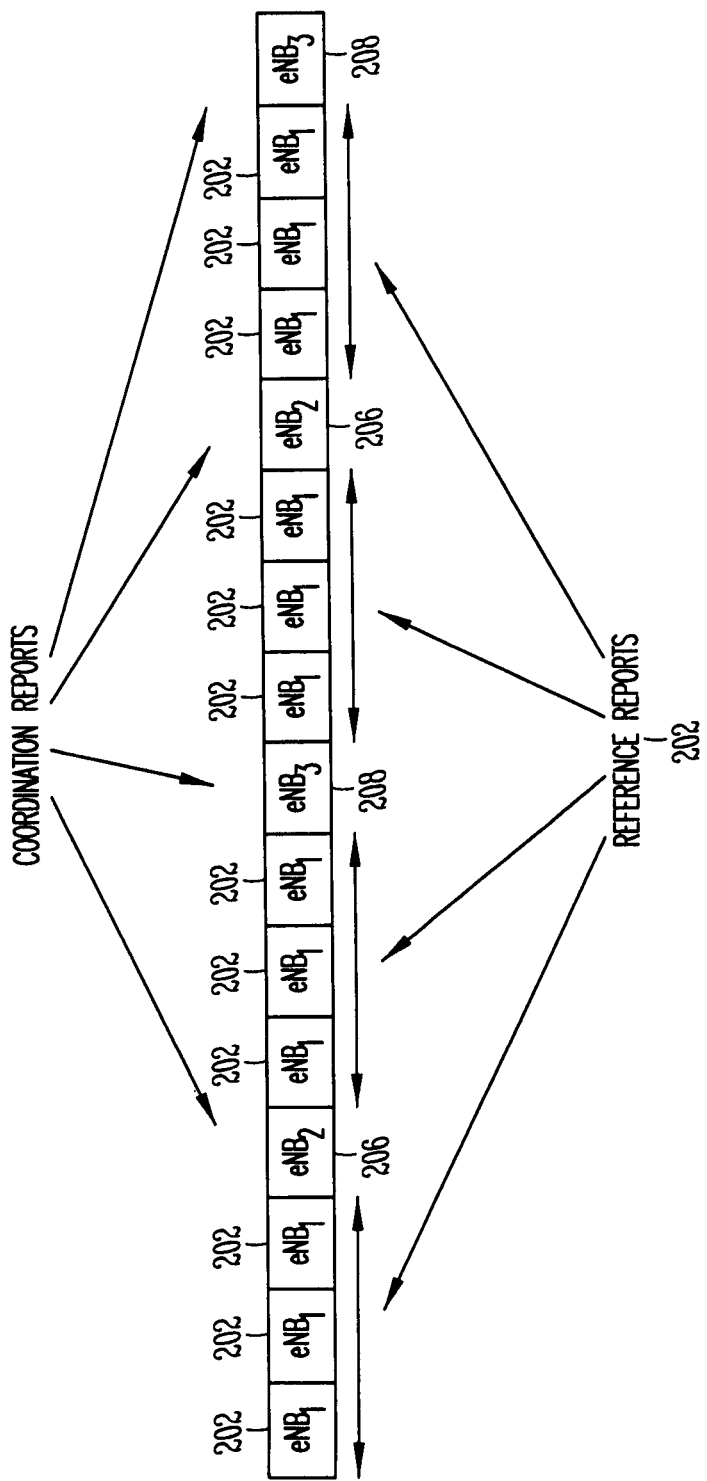
FIG. 2 illustrates a reporting scheme in accordance with some embodiments.

FIG. 2 illustrates a reporting scheme in accordance with some embodiments. The reporting scheme may include a reference report 202 generated by the UE 104 (FIG. 1) that is fed back to the serving eNB 102 (FIG. 1). The reporting scheme may also include a coordination report for each cooperating eNB 106 (FIG. 1) generated by the UE 104 that is fed back to the serving eNB 102. The reference report 202 may be associated with the serving eNB 102 (eNB$_1$), a coordination report 206 may be associated with a first cooperating eNB (eNB$_2$), and a coordination report 208 may be associated with a second cooperating eNB (eNB$_3$).

In accordance with embodiments, the reference CQI, a reference PMI and a reference rank indicator (RI) may be included in the reference report 202. The coordination CQI, the coordination PMI and a coordination RI may be included in the coordination reports 206 and 208 for each cooperating eNB. In LTE embodiments, for a rank two transmission, the PMIs would be selected from a rank two codebook, for example.

In some embodiments, the reference report 202 and the coordination reports 206 and 208 may be time-division multiplexed (TDM) for transmission on an uplink (UL) channel to the serving eNB 102 as illustrated in FIG. 2. In LTE embodiments, the uplink channel may be a physical uplink control channel (PUCCH) for periodic transmissions, or the uplink channel may be the physical uplink shared channel (PUSCH) for aperiodic transmissions, although the scope of the embodiments is not limited in this respect.

In other embodiments, the reference report 202 and the coordination reports 206 and 208 may be frequency-division multiplexed (FDM) and transmitted in the same UL frame (i.e., on different sets of subcarriers) of the uplink channel, although the scope of the embodiments is not limited in this respect as other feedback configurations may also be used.

In some embodiments, the reference report 202 and the coordination reports 206 and 208 may jointly encoded by the UE 104 into a single report for transmission on an uplink (UL) channel to the serving eNB 102. The UE 104 may also differentially encode the one or more coordination CQIs with respect to the reference CQI. The differentially encoded CQIs may be provided in the coordination reports 206 and 208 thereby reducing overhead for CQI feedback.

In some embodiments, the periodicity of the coordination reports 206, 208 may be different than the periodicity of the reference reports. In the example embodiment shown in FIG. 2, three reference reports 202 for each coordination report 206 or 208 are shown. The reduced periodicity of the coordination reports 206, 208 may be used, for example, when coordination mode is used less frequently than uncoordinated mode.

The reference PMI included in the reference report 202 may be a suggested PMI for use by the serving eNB 102 for transmitting the beamformed transmission 103 through the direct channel to the UE 104. The reference RI included in the reference report 202 may indicate a preferred transmission rank for the serving eNB 102 for use by the serving eNB 102 for transmitting the beamformed transmission 103 through the direct channel to the UE 104. Each coordination PMI included in a coordination report 206 may be for use by a cooperating eNB 106 for interference suppression with the UE 104 during the beamformed transmission 103 when operating in coordination mode. In some embodiments, the reference reports 202 and the coordination reports 206 and 208 may be CQI/PMI/RI reports and may be configured in accordance with one of the 3GPP LTE standards.

In joint transmission mode embodiments, the cooperating eNBs 106 may jointly transmit beamformed signals to the UE 104. In these embodiments, the serving eNB 102 may be configured to provide either the modified CQI or the selected MCS, and to provide the coordination PMIs (as well as the data for transmission) to the cooperating eNBs 106. The serving eNB 102 may also provide RB information to the cooperating eNBs 106. The cooperating eNBs 106 may to precode (using the coordination PMIs) and jointly transmit beamformed signals during the indicated RB to enable diversity reception by the UE 104. In these embodiments, each cooperating eNB 106 may simultaneously and synchronously transmit the same information by concurrent beamformed transmissions in accordance with the selected MCS thereby maximizing signal strength and signal quality. In these embodiments, the same RBs of an OFDMA frame may be used by the cooperating eNBs 106 for the joint transmission. In these embodiments, the RB information may be provided to the cooperating eNBs 106 over the backhaul links 105 (FIG. 1) to indicate the RBs to be used in the joint transmission to allow the cooperating eNBs 106 to coordinate transmissions.

In these joint transmission mode embodiments, the coordination PMI included in a coordination report 206 is for use by a cooperating eNB 106 for precoding joint transmissions to the UE 104 when operating in joint transmission mode. The coordination RI included in a coordination report 206 indicates a preferred transmission rank for use by a cooperating eNB 106 for precoding joint transmission to the UE 104 when operating in joint transmission mode. The coordination PMIs may be provided by the serving eNB 102 to the cooperating eNBs 106 over backhaul links 105 when operating in coordination mode and joint transmission mode. The selected MCS may also be provided by the serving eNB 102 to the cooperating eNBs 106 over the backhaul links 105 when operating in joint transmission mode.

Figure 3:
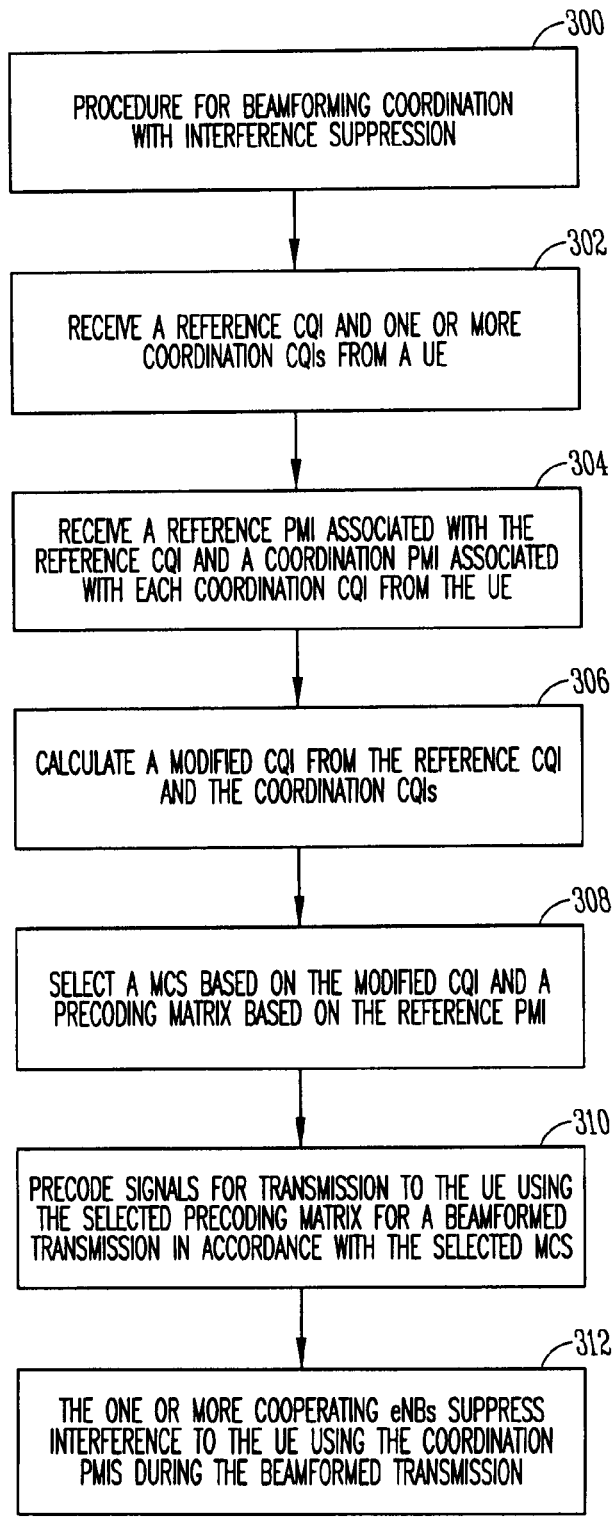
FIG. 3 is a procedure for beamforming coordination with interference suppression in accordance with some embodiments.

FIG. 3 is a procedure for beamforming coordination with interference suppression in accordance with some embodiments. Procedure 300 may be performed by eNBs of a CoMP network, such as network 100 (FIG. 1) when operating in coordination mode. Operations 302 through 310 may be performed by a serving eNB, such as serving eNB 102 (FIG. 1), and operation 312 may be performed by one or more cooperating eNBs, such as cooperating eNBs 106 (FIG. 1).

Operation 302 comprises receiving a reference CQI and one or more coordination CQIs from a UE. The reference CQI may be selected by the UE based on direct channel information from the serving eNB. Each coordination CQI may be selected by the UE based on both the direct channel information and interfering channel information for each of the cooperating eNBs.

Operation 304 comprises receiving a reference PMI associated with the reference CQI and a coordination PMI associated with each coordination CQI from the UE. The serving eNB may provide the coordination PMIs to the cooperating eNBs over backhaul links. The serving eNB may also provide resource block information to the cooperating eNBs over the backhaul links. The resource block information may indicate the RB in an OFDMA frame to be used by the cooperating eNBs for interference suppression to the UE in operation 312 below.

Operation 306 comprises calculating a modified CQI from the reference CQI and the coordination CQIs.

Operation 308 comprises selecting a MCS based on the modified CQI and a precoding matrix based on the reference PMI. The MCS that is selected based on the modified CQI and may provide a greater data rate or throughput than an MCS that would be selected based solely on the reference CQI.

Operation 310 comprises precoding signals for transmission to the UE using the selected precoding matrix for a beamformed transmission in accordance with the selected MCS.

Operation 312 comprises the one or more cooperating eNBs suppressing interference to the UE using the coordination PMIs during the allocated RB. In some embodiments, the cooperating eNBs use the coordination PMIs to adjust their beamformed transmissions within nearby cells to other UEs to suppress interference to the UE by applying beamforming vectors that are at least partially orthogonal to eigenvectors reported by the UE to the serving eNB in the form of the coordination PMIs.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, eNBs 102 and 106, as well as UE 104 may include one or more processors and may be configured with instructions stored on a computer-readable storage device to perform the operations described herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The invention claimed is:

1. An enhanced Node-B (eNB) configured to operate as a serving eNB in a coordinated multi-point (CoMP) communication network, the serving eNB configured to:
   receive a reference channel quality indicator (CQI) and one or more coordination CQIs from user equipment (UE), the reference CQI being selected by the UE based on direct channel information from the serving eNB and the one or more coordination CQIs being selected by the UE based on both the direct channel information and interfering channel information for each corresponding cooperating eNB, wherein the interfering channel information is derived from reference signals or pilots received at the UE from the corresponding cooperating eNB;
   receive a reference precoding matrix indicator (PMI) associated with the reference CQI and a coordination PMI associated with each coordination CQI from the UE;
   calculate a modified CQI from the reference CQI and the coordination CQIs;
   provide the coordination PMIs to one or more cooperating eNBs for interference suppression; and
   precode signals for transmission to the UE using a precoding matrix that is selected based on the reference PMI for a beamformed transmission in accordance with a modulation and coding scheme (MCS) that is selected from the modified CQI.

2. The eNB of claim 1 wherein the MCS that is selected based on the modified CQI is configured to provide a greater data rate than an MCS that would selected based solely on the reference CQI, and
   wherein when operating in coordination mode, the cooperating eNBs are configured to suppress interference with the UE using the coordination PMIs during the beamformed transmission from the serving eNB to the UE.

3. The eNB of claim 2 wherein the serving eNB is configured to:
   provide the coordination PMIs to the cooperating eNBs over backhaul links, and provide resource block information to the cooperating eNBs over the backhaul links, the resource block information indicating a resource block (RB) in a OFDMA frame to be used by the cooperating eNBs for interference suppression to the UE.

4. The eNB of claim 2 wherein when the cooperating eNBs are operating in coordination mode, the cooperating eNBs are configured to use the coordination PMIs to adjust their beamformed transmissions within nearby cells to other UEs to suppress interference to the UE by applying beamforming vectors that are at least partially orthogonal to eigenvectors reported by the UE to the serving eNB in the form of the coordination PMIs.

5. The eNB of claim 2 wherein the direct channel information used by the UE to determine the reference CQI is based on a direct channel matrix (H) and a signal-to-noise and interference ratio (SINR) derived from reference signals or pilots received from the serving eNB over a direct channel between the serving eNB and UE, and wherein the interfering channel information used by the UE to determine the coordination CQI associated with each of the cooperating eNBs comprises an interfering channel matrix (G) of the interference channel derived from reference signals or pilots received from the cooperating eNB.

6. The eNB of claim 1 wherein the reference CQI, reference precodingmatrix indicator (PMI) and a reference rank indicator (RI) are included in a reference report that is fed back to the serving eNB, and
   wherein the coordination CQI, the coordination PMI and a coordination RI are included in a coordination report for each cooperating eNB that is fed back by the UE to the serving eNB.

7. The eNB of claim 6, wherein the reference report and the coordination reports are time-division multiplexed (TDM) for transmission on an uplink (UL) channel to the serving eNB, and
   wherein a periodicity of the coordination reports is less than a periodicity of the reference report.

8. The eNB of claim 6, wherein the reference report and the coordination reports are jointly encoded by the UE into a single report for transmission on an uplink (UL) channel to the serving eNB.

9. The eNB of claim 6 wherein the UE is configured to differentially encode the coordination CQIs with respect to the reference CQIs, and
   wherein the differentially encoded CQIs are provided in the coordination reports.

10. The eNB of claim 6 wherein the reference PMI included in the reference report is a suggested PMI for use by the serving eNB for transmitting the beamformed transmission through the direct channel to the UE,
   wherein the reference RI included in the reference report indicates a preferred transmission rank for the serving eNB for use by the serving eNB for transmitting the beamformed transmission through the direct channel to the UE, and
   wherein each coordination PMI included in a coordination report is for use by a cooperating eNB for interference suppression with the UE during the beamformed transmission when operating in coordination mode.

11. The eNB of claim 1 wherein when the cooperating eNBs are operating in a joint transmission mode:
   the serving eNB is configured to provide either the modified CQI or the selected MCS and the coordination PMIS, as well as data for transmission, to the cooperating eNBs; and
   the cooperating eNBs are configured to precode and jointly transmit beamformed signals to enable diversity reception by the UE.

12. A method for beamforming coordination with interference suppression in which a serving enhanced Node-B (eNB) sends a coordination precoding matrix indicator (PMI) and rank indicator (RI) to one or more cooperating eNBs, the coordination PMI and RI providing information, respectively, about an interference channel and a preferred transmission rank,
   wherein the method includes:
   the coordinating eNBs configuring their transmissions based on the coordination PMI and the RI to suppress interference to a user equipment (UE) during a beamformed transmission by a serving eNB; and
   the serving eNB configuring the beamformed transmission to the UE based on a modified channel quality indicator (CQI) index that takes into account the suppressed interference; and
   the serving eNB receiving a reference CQI and one or more coordination CQIs from the UE, the reference CQI being selected by the UE based on direct channel information from the serving eNB and the one or more coordination CQIs being selected by the UE based on both the direct channel information and interfering channel information for each corresponding cooperating eNB, wherein the interfering channel information is derived from reference signals or pilots received at the UE from the corresponding cooperating eNB.

13. The method of claim 12 wherein the method includes:
   receiving a reference PMI associated with the reference CQI and a coordination PMI associated with each coordination CI from the UE;
   calculating the modified CQI from the reference CQI and the coordination CQIs; and
   precoding signals for transmission to the UE using a precoding matrix that is selected based on the reference PMI for the beamformed transmission in accordance with a modulation and coding scheme (MCS) that is selected from the modified CQI.

14. The method of claim 13 wherein the MCS that is selected based on the modified CQI is configured to provide a greater data rate than an MCS that would selected based solely on the reference CQI.

15. The method of claim 14 wherein the direct channel information used by the UE to determine the reference CQI is based on a channel matrix (H) and a signal-to-noise and interference ratio (SINR) derived from reference signals or pilots received from the serving eNB over a direct channel between the serving eNB and the UE, and
   wherein the interfering channel information used by the UE to determine the coordination CQI associated with each of the cooperating eNBs comprises an interfering channel matrix (G) of the interference channel derived from reference signals or pilots received from the cooperating eNB.

16. The method of claim 13 wherein the reference CQI, reference precoding matrix indicator (PMI) and a reference rank indicator (RI) are included in a reference report that is fed back to the serving eNB, and
   wherein the coordination CQI, the coordination PMI and a coordination RI are included in a coordination report for each cooperating eNB that is fed back by the UE to the serving eNB.

17. A method for operating an enhanced Node-B (eNB) as a serving eNB in a coordinated multi-point (CoMP) communication network, the method comprising:
   receiving a reference channel quality indicator (CQI) and one or more coordination CQIs from user equipment (UE);
   receiving a reference precoding matrix indicator (PMI) associated with the reference CQI and a coordination PMI associated with each coordination CQI from the UE, the reference CQI being selected by the UE based on direct channel information from the serving eNB and the one or more coordination CQIs being selected by the UE based on both the direct channel information and interfering channel information for each corresponding cooperating eNB, wherein the interfering channel information is derived from reference signals or pilots received at the UE from the corresponding cooperating eNB;
   calculating a modified CQI from the reference CQI and the coordination CQIs;
   providing the coordination PMIs to one or more cooperating eNBs for interference suppression; and
   precoding signals for transmission to the UE using a precoding matrix that is selected based on the reference PMI for a beamformed transmission in accordance with a modulation and coding scheme (MCS) that is selected from the modified CQI.

18. The method of claim 17 wherein the method includes the serving eNB selecting the MCS based on the modified CQI is configured to provide a greater data rate than an MCS that would selected based solely on the reference CQI, and
   wherein when operating in coordination mode, the cooperating eNBs are configured to suppress interference with the UE using the coordination PMIs during the beamformed transmission from the serving eNB to the UE.

19. The method of claim 18 further comprising providing, by the serving eNB, resource block information to the cooperating eNBs, the resource block information indicating a resource block (RB) in an OFDMA frame to be used by the cooperating eNBs for interference suppression to the UE.

20. The method of claim 18 wherein the direct channel information used by the UE to determine the reference CQI is based on a direct channel matrix (H) and a signal-to-noise and interference ratio (SINR) derived from reference signals or pilots received from the serving eNB over a direct channel between the serving eNB and the UE, and wherein the interfering channel information used by the UE to determine the coordination CQI associated with each of the cooperating eNBs comprises an interfering channel matrix (G) of the interference channel derived from reference signals or pilots received from the cooperating eNB.

* * * * *